United States Patent
Sweeney

Patent Number: 6,019,399
Date of Patent: Feb. 1, 2000

[54] SPLIT-RING FLUID COUPLING FOR CORRUGATED TUBING AND METHOD OF ASSEMBLY

[75] Inventor: Michael A. Sweeney, Kent, Ohio

[73] Assignee: Parker-Hannifin Corporation, Cleveland, Ohio

[21] Appl. No.: 08/990,206

[22] Filed: Dec. 13, 1997

Related U.S. Application Data

[60] Provisional application No. 60/035,901, Jan. 23, 1997.

[51] Int. Cl.⁷ ..................................................... F16L 37/18
[52] U.S. Cl. ......................... 285/248; 285/903; 285/321; 285/334.5
[58] Field of Search ................................. 285/903, 334.5, 285/321, 354, 318, 382.7, 248, 249

[56] References Cited

U.S. PATENT DOCUMENTS

| | | |
|---|---|---|
| 96,914 | 11/1869 | Hill . |
| 178,313 | 6/1876 | Leland . |
| 262,581 | 8/1882 | Doolittle . |
| 546,314 | 9/1895 | Farrey . |
| 2,112,238 | 3/1938 | Guarnaschelli . |
| 2,113,211 | 4/1938 | Lake . |
| 2,323,912 | 7/1943 | Johnson . |
| 2,357,669 | 9/1944 | Lake . |
| 2,363,586 | 11/1944 | Guarnaschelli . |
| 2,424,727 | 7/1947 | Wenk . |
| 2,430,657 | 11/1947 | Zolleis . |
| 2,496,149 | 1/1950 | Cahenzli, Jr. . |
| 2,497,273 | 2/1950 | Richardson . |
| 2,503,826 | 4/1950 | Lamont .................................. 285/384 |
| 2,549,741 | 4/1951 | Young . |
| 2,848,254 | 8/1958 | Millar . |
| 2,858,147 | 10/1958 | Guarnaschelli . |
| 2,946,607 | 7/1960 | Bauer . |
| 2,991,093 | 7/1961 | Guarnaschelli . |
| 3,008,736 | 11/1961 | Samiran . |
| 3,112,937 | 12/1963 | Williams . |
| 3,214,200 | 10/1965 | Carlson et al. . |

(List continued on next page.)

FOREIGN PATENT DOCUMENTS

| | | |
|---|---|---|
| 0 331 116 | 9/1989 | European Pat. Off. . |
| 0 545 410 | 6/1993 | European Pat. Off. . |
| 2 589 979 | 5/1987 | France . |
| 26 27 397 | 12/1977 | Germany . |
| 35 08 198 | 9/1986 | Germany . |
| 404125389 | 4/1992 | Japan . |
| 406011084 | 1/1994 | Japan . |
| 0017425L71 | 6/1992 | U.S.S.R. . |
| 1371609 | 10/1974 | United Kingdom . |
| WO998/06970 | 2/1998 | WIPO . |

OTHER PUBLICATIONS

Design and Installation Guide dated Apr. 1996 of Gastite.
Literature on TracPipe, entitled "TracPipe Runs Circles Aroud Black Iron Pipe" of Mestek, Inc.

*Primary Examiner*—Eric K Nicholson
*Attorney, Agent, or Firm*—John A. Molnar, Jr.

[57] ABSTRACT

A fluid coupling for connecting a corrugated tube to a fitting. The coupling includes an annular compression member having an opening therethrough which extends from a forward end portion receivable coaxially over the tube to a rearward end portion threadably engagable with the fitting to urge the tube into a fluid-tight engagement therewith. The forward end portion of the opening has a rearward first end, a forward second end defining the inner diametric extent of the opening, and an inner radial surface extending therebetween from a rearward gland portion to a forward camming portion. An annular locking member is journalled within the gland to be received therewith over the tube. The locking member is expandable within the gland by the crest portions of the tube as the locking and compression members are received thereover, and is compressible within a root portion of the tube responsive to the bearing of the compression member camming surface thereon as the compression member is threadably engaged with the fitting. When compressed, the locking member delimits the forward advancement of the tube out of the opening of the compression member.

15 Claims, 3 Drawing Sheets

U.S. PATENT DOCUMENTS

| | | |
|---|---|---|
| 3,294,426 | 12/1966 | Lyon . |
| 3,306,637 | 2/1967 | Press et al. . |
| 3,381,980 | 5/1968 | Smith . |
| 3,454,290 | 7/1969 | Tairraz . |
| 3,888,522 | 6/1975 | Moreiras ............................ 285/382.7 |
| 4,046,451 | 9/1977 | Juds et al. . |
| 4,136,897 | 1/1979 | Haluch . |
| 4,423,891 | 1/1984 | Menges . |
| 4,630,850 | 12/1986 | Saka . |
| 4,669,761 | 6/1987 | Huling . |
| 4,674,775 | 6/1987 | Tajima et al. . |
| 4,867,489 | 9/1989 | Patel . |
| 4,872,710 | 10/1989 | Konecny et al. ....................... 285/318 |
| 4,904,002 | 2/1990 | Sasa et al. . |
| 4,907,830 | 3/1990 | Sasa et al. . |
| 4,909,547 | 3/1990 | Guy . |
| 5,080,405 | 1/1992 | Sasa et al. . |
| 5,131,145 | 7/1992 | Badoureauz . |
| 5,226,682 | 7/1993 | Marrison et al. . |
| 5,261,707 | 11/1993 | Kotake et al. . |
| 5,292,156 | 3/1994 | Sasa et al. . |
| 5,356,181 | 10/1994 | Shirogane et al. . |
| 5,413,147 | 5/1995 | Moreiras et al. . |
| 5,423,578 | 6/1995 | Kanomata et al. . |
| 5,441,312 | 8/1995 | Fujiyoshi et al. . |
| 5,489,127 | 2/1996 | Anglin et al. . |
| 5,543,582 | 8/1996 | Stark et al. . |
| 5,580,105 | 12/1996 | Miller, Jr. et al. . |
| 5,799,989 | 9/1998 | Albino . |

SPLIT-RING FLUID COUPLING FOR CORRUGATED TUBING AND METHOD OF ASSEMBLY

CROSS REFERENCE TO RELATED APPLICATION

This application claims the benefit of U.S. Provisional No. 60/035,901, filed Jan. 23, 1997.

BACKGROUND OF THE INVENTION

The present invention relates generally to a coupling for connecting corrugated tubing with a fitting, and more particularly to a coupling which includes an internally-received, split ring member which facilitates the assembly of the coupling.

Corrugated tubing, often fabricated of stainless steel, copper, or the like and jacketed with a plastic material, is commonly employed in residential or commercial building constructions as a transitional fluid conduit extending between an appliance or other machine and a rigid auxiliary line, pipe, or other connection of a fuel source which typically is natural gas, propane, or the like. The flexibility of such tubing facilitates the alignment of couplings and other connections, and also accommodates limited movement of the appliance or machine with respect to the rigid connection of the fuel source.

More recently, tubing of such type has been proposed as a substitute for traditional hard, i.e., inflexible, steel or iron "black" pipe in gas line applications residential and commercial construction. Again, the flexibility of the tubing facilitates its installation through walls, ceilings, and floors and, especially, the alignment of the tubing connections. Such tubing, moreover, is lightweight, easy to carry, requires no threading or heavy equipment therefor, allows the use of fewer fitting connections, and exhibits less leak potential than conventional, hard piping. Corrugated tubing of the type herein involved additionally is used in other fluid transport applications such as in air conditioning, hydraulics, and general plumbing, and also as conduit for electrical applications.

It is common practice to terminate either or both of the distal ends of a length of corrugated tubing with a coupling for providing a leak-free connection or other transition, and/or for effecting a mechanical locking of the tubing ends limiting their movement under pressure or force. For example, U.S. Pat. Nos. 5,441,312; 4,630,850; 4,674,775; and 2,323,912 disclose couplings of such type which generally comprise a sleeve and a cap nut. The sleeve and nut are coaxially received over a distal end of the tube for connection to a fitting associated with the auxiliary line or the appliance.

Commonly-assigned, co-pending provisional application U.S. Ser. No. 60/017,227, filed May 9, 1996, discloses a coupling for connecting a distal end of a corrugated tube with a fitting having a forward coupling end with a tapered surface. The coupling includes a collet having a circumferential wall portion which extends axially from a forward first end to a rearward second end. The second end is configured as having an outer portion and an inner portion of a second diameter smaller than the outer periphery of the tube. The inner portion is configured to be receivable within the root portions of the tube for retaining the collet thereon, and presents a generally rearwardly-facing compression surface. The wall portion is longitudinally dissected through the second end thereof into at least a pair of arcuate, cantilevered segments. Each segment is resiliently yieldable for radial outward movement allowing the tube crest portions to be received through the second end of the wall portion as the collet is advanced forwardly over the distal end of the tube into retention within one of the root portions. A fastening member is journalled over the collet second end and is engagable with the coupling end of the fitting to draw the collet and the distal end of the tube toward the fitting. The fastening member has an inner radial surface extending to a rearwardly-facing shoulder portion configured to abuttingly engage the outer portion of the collet second end for urging the collet rearwardly toward the fitting compressing at least the first crest portion of the fitting distal end between the tapered surface of the fitting and the compression surface of the collet.

Young, U.S. Pat. No. 2,549,741, discloses a pipe joint which includes a coupling nut adapted for a threaded connection with a spigot member. The coupling nut has an internal groove for receiving a split ring, and the spigot member has a conical surface for receiving the flared surface of a pipe. Upon the tightening of the nut on the spigot member, the split ring is made to compresses the flared pipe surface against the spigot.

Sasa et al., U.S. Pat. No. 4,904,002, discloses a fluid coupling for a corrugated pipe which includes a body having a fluid passage, and an outer sleeve having a collar which retains a pair of C-rings. The outer sleeve is adapted to reduce the diameter of the C-rings such that the rings are forced into the root portions of the corrugated pipe wherein the rings are held axially in position.

Sasa et al., U.S. Pat. No. 5,080,405, discloses another coupling for corrugated pipe which includes an inner cylindrical section having an annular groove for receiving a split ring. The groove extends from a forward flange portion to a rearward tapered surface which is formed on the groove. Upon the insertion of an end of the pipe into the cylindrical section, the ring is urged into a corrugation of the corrugated pipe by the tapered surface of the groove.

Sasa et al., U.S. Pat. No. 5,292,156, discloses another fluid coupling for a corrugated pipe. The coupling includes a locking cylinder having a groove which accommodates the radial expansion of a ring received therein when the end of a corrugated pipe is inserted into the cylinder.

Hughes, U.K. Patent No. 1,371,609, discloses another joint for a corrugated pipe which includes a fitting to which a nut is threadably connected. The nut is formed as having a groove portion for retaining a split compression ring. Upon the insertion of an end of the pipe into the nut, the split ring is urged into a into a corrugation of the pipe. The nut then may be tightened on the fitting for drawing the pipe inward into a fluid-tight connection.

Marrison et al., U.S. Pat. No. 5,226,682 discloses a coupling including a first and second member and an annular locking ring interposable therebetween. For receiving the locking ring, the first member is provided as having an exterior surface with a groove, and the second member is provided as having an inner surface with a cavity. The first and second members are secured together when the locking ring is engaged in the groove ands the cavity.

Another coupling for corrugated tubing is marketed commercially by Titeflex Corp., Springfield, Mass. As is described in the Titeflex publication "Gastite™ Design and Installation Guide," April 1996, such coupling employs a two-piece metal split ring for positioning a swivel nut. The nut is slidably mounted over the end of the tubing, and the split rings are positioned in the valley, i.e., root or trough, of the first convolution of the corrugations. The nut then is advanced toward the end of the tubing to capture the split rings. A socket flaring tool next is threaded into the nut and tightened. The tightening of the flaring tool compresses the first convolution of the tubing to form a flared seat. The nut lastly is threadably engaged with a corresponding end of the fitting.

However, the provision of two-piece split rings has been observed to complicate the assembly of the coupling. For example, as being of a relatively small size and separate from the nut, there is the potential for the rings to be lost or simply forgotten during installation. One or both of the rings might also fall out of the tubing prior to the connection of the nut to the fitting. If either of the rings is accidentally omitted, the tubing cannot be sealed to the fitting and a hazardous leak may result.

As the use of corrugated tubing in gas line and other fluid transfer applications continues to increase, it will be appreciated that further improvements in the design of couplings therefor would be well-received by both industry and consumers alike. A preferred design would be economical to manufacture, but would also simplify the assembly of the coupling while providing a connection which minimizes the potential for leaks and the like.

SUMMARY OF THE INVENTION

The present invention is directed to a coupling for corrugated tubing, and more particularly to a female coupling assembly for threadably connecting the end of a length of corrugated tubing to an associated male fitting. The assembly includes a nut or the like having an internal gland which extends from a forward shoulder portion to a rearward camming surface. An annular locking member, such as split wire ring is retained within the gland intermediate the forward shoulder portion and rearward camming surface thereof. Within the gland, the locking member is deflectable from a normal to an expanded inner diameter by the rearward insertion of the tubing end through the nut. After the insertion, the locking member is deflected by the camming surface of the nut into one of the corrugations of the tubing for the positive retention of the retaining the nut on the tubing end. Advantageously, the one-piece locking member of the invention may be pre-installed and retained within the nut during manufacture. In this way, assembly of the coupling is simplified to better ensure that a leak-free or other secure connection is obtained.

It therefore is a feature of a preferred embodiment of the present invention to provide a coupling for connecting the distal end of a corrugated tube in fluid communication with a fitting having a forward coupling end with an externally-threaded surface. The coupling includes an annular compression member having an opening therethrough which extends from a forward end portion receivable coaxially over the tube to a rearward end portion threadably engagable with the fitting to urge the tube into a fluid-tight engagement therewith. The forward end portion of the opening has a rearward first end, a forward second end defining the inner diametric extent of the opening, and an inner radial surface extending therebetween from a rearward gland portion to a forward camming portion. An annular locking member is journalled within the gland to be received therewith over the tube. The locking member is expandable within the gland by the crest portions of the tube as the locking and compression members are received thereover, and is compressible within a root portion of the tube responsive to the bearing of the compression member camming surface thereon as the compression member is threadably engaged with the fitting. When compressed, the locking member delimits the forward advancement of the tube out of the opening of the compression member.

It is a further feature of the preferred embodiment of the present invention to provide a fluid coupling assembly for connecting the distal end of a corrugated tube in fluid communication with a fitting having a forward coupling end with an externally-threaded surface. The assembly includes an annular compression member having an opening therethrough which extends from a forward end portion received coaxially over the tube to a rearward end portion threadably engagable with the fitting to urge the tube into a fluid-tight engagement therewith. The forward end portion of the opening has a rearward first end, a forward second end defining the inner diametric extent of the opening, and an inner radial surface extending therebetween from a rearward gland portion to a forward camming portion. An annular locking member is journalled coaxially within the gland and is received therewith over the tube. The locking member is expandable within the gland by the crest portions of the tube as the locking and compression members are received thereover, and is compressible within a root portion of the tube responsive to the bearing of the compression member camming surface thereon as the compression member is threadably engaged with the fitting. When compressed, the locking member delimits the forward advancement of the tube out of the opening of the compression member.

It is yet a further feature of the preferred embodiment of the present invention to provide a method of coupling a distal end of a corrugated tube in fluid communication with a fitting of a variety having an externally-threaded forward end. In accordance with the method, a compression member is provided as having an opening therethrough extending which extends from a forward end portion receivable coaxially over the distal end of the tube a rearward end portion threadably engagable with the fitting. The forward end portion of the opening has a rearward first end, a second end defining the inner diametric extent of the opening, and an inner radial surface extending therebetween from a rearward gland portion to a forward camming portion. An annular locking member is journalled within the gland of the compression member to be received therewith over the distal end of the tube. The distal end of the tube then is advanced rearwardly through the opening of the compression member to dispose the locking member in a root portion of the tube retaining the compression member thereon. As the tube is advanced through the opening, the locking member is expanded within the gland to accommodate the crest portions of the tube. Lastly, the rearward end portion of the compression member is threadably engaged with the fitting urging the distal end of the tube into a fluid-tight engagement therewith. As the compression member is threaded onto the fitting, the locking member is thereby compressed within the root portion of the tube responsive to the bearing of the camming surface thereon. The compression of the locking member delimits the forward advancement of the tube distal end out of the compression member opening.

Advantages of the present invention include a coupling construction for corrugated tubing which simplifies assembly with better assurance that a leak-free connection is attained. Additional advantages include a coupling construction which provides for the retention and positive positioning of a one-piece locking member, and which effects a fluid-tight connection of the tubing to an associated fitting. Still other advantages include a coupling which is economical to manufacture and assemble, and which is capable of withstanding prolonged exposure to natural gas and other hydrocarbons at relatively high service pressures. These and other advantages will be readily apparent to those skilled in the art based upon the disclosure contained herein.

BRIEF DESCRIPTION OF THE DRAWINGS

For a fuller understanding of the nature and objects of the invention, reference should be had to the following detailed description taken in connection with the accompanying drawings wherein.

Figure 1:
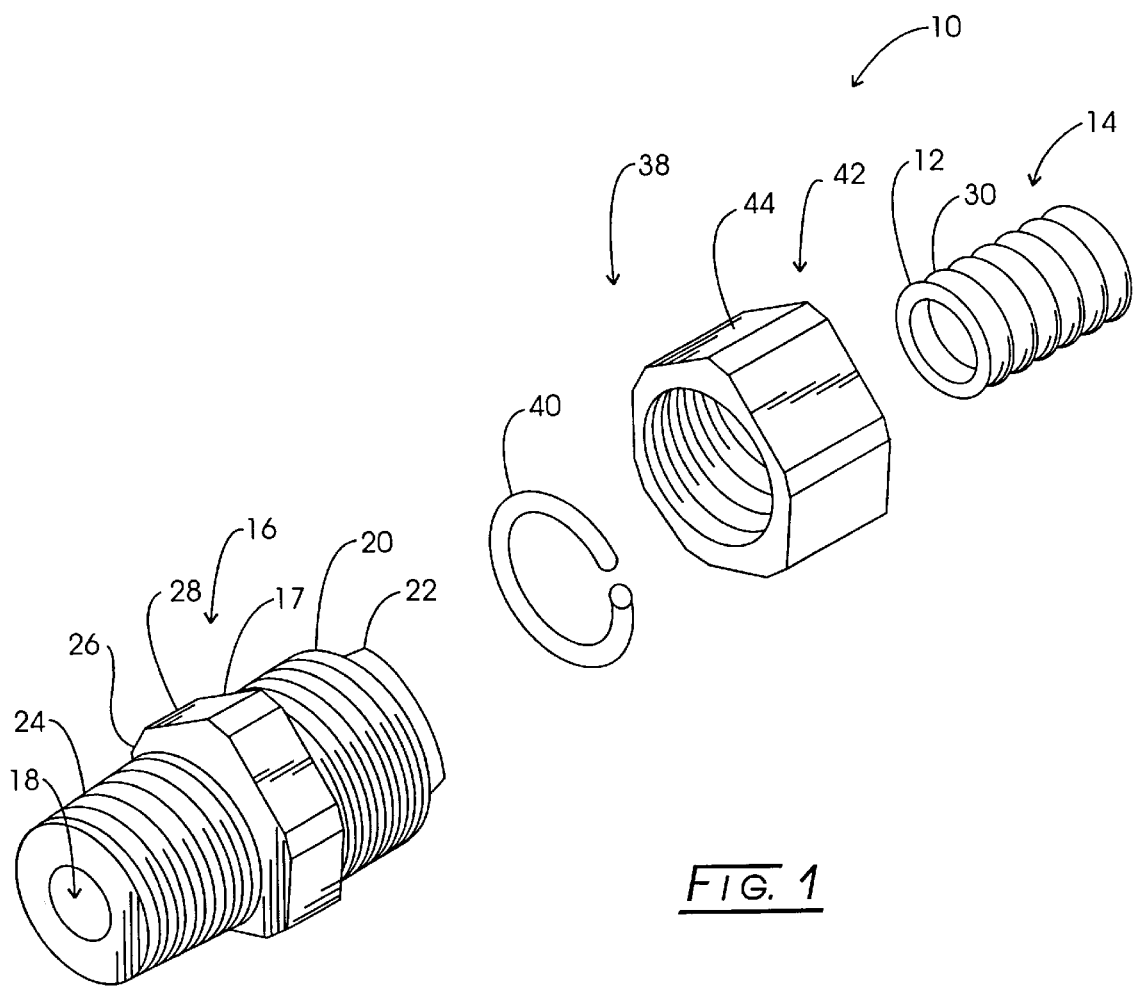
FIG. 1 is an exploded, perspective view of a split ring coupling constructed in accordance with the present invention for connecting the distal end of a length of corrugated tubing in fluid communication with an associated fitting.

The drawings will be described further in connection with the following Detailed

DETAILED DESCRIPTION OF THE INVENTION

Certain terminology may be employed in the description to follow for convenience rather than for any limiting purpose. For example, the terms "forward" and "rearward" designate directions in the drawings to which reference is made, with the terms "radial" and "axial" referring, respectively, to directions perpendicular and parallel to the longitudinal central axis of the referenced element. Terminology of similar import other than the words specifically mentioned above likewise is to be considered as being used for purposes of convenience rather than in any limiting sense.

For the purposes of the discourse to follow, the precepts of the invention herein involved are described in connection with a corrugated tubing coupling and assembly therefor particularly adapted for use in fuel gas line applications in residential or commercial construction such as for connecting an appliance or the like to a fuel gas source. It will be appreciated, however, that aspects of the present invention may find utility in other conduit systems, whether for fluids or for electrical or other applications which utilize corrugated tubing. Use within those systems therefore should be considered to be expressly within the scope of the present invention.

Referring then to the figures wherein corresponding reference characters are used to designate corresponding elements throughout the several views, shown generally at 10 is an assembly according to the present invention for connecting the distal end, 12, of a length of corrugated tubing, represented generally at 14, in fluid communication with a fitting, represented generally at 16. Fitting 16, which is formed of a generally tubular body, 17, with an axial bore, 18, therethrough, is shown to be of a variety having an externally-threaded forward coupling end, 20, which terminates in a generally forwardly-tapered surface, 22. The rearward end, 24, of fitting 16 similarly may be externally-threaded for connection to an auxiliary line of a fuel source, to an appliance or the like (not shown), or to another conduit. Body 17 of fitting 16 additionally may be formed as having a radial flange, 26, with hexagonal flats portion, one of which is referenced at 28, configured for engagement with a wrench or other tool during installation or connection.

Tubing 14, which may be constructed of stainless steel or another metallic material, is conventionally formed of a sinusoidal series of uniform corrugations or convolutions, a first one of which is referenced at 30. As may be best seen through momentary reference to FIG. 7, wherein a partial longitudinally-sectioned side view of tubing 14 is shown in schematic, the convolutions define alternating crest portions which, as is shown at line 32, define the outer periphery of tubing 14, and root or trough portions which extend radially inwardly from outer periphery 32. Distal end 12 of tubing 14 is sectioned or otherwise formed to terminate at a first crest portion, 34, having an associated first root portion, 36.

Returning to FIG. 1, assembly 10 includes, in accordance with the precepts of the present invention, a coupling, referenced generally at 38, which, in turn, includes a generally annular locking member, 40, and an associated compression member, represented generally at 42. Preferably, compression member 42 is configured as a cap nut or the like having hexagonal flats portion, one of which is referenced at 44, for engagement with a wrench or other tool during its threaded connection with fitting 16. Looking additionally to FIG. 2 wherein coupling 38 is shown as assembled, compression member 42 may be seen to be formed as having an axial opening, represented at 46, extending therethrough along a central longitudinal axis, 48, from a forward end portion, 50, of an inner diametric extent, do, which is received coaxially over the distal end 12 of tubing 14, to an internally-threaded reward end portion, 52, which is threadably engagable with the externally-threaded forward end 20 of fitting 16. As received over the tubing distal end, the forward end portion 50 of opening 46 extends, in turn, axially along axis 48 from a rearward first end, 54, to a radially-inwardly extending or flanged second end, 56, which defines the inner diametric extent do of opening 46.

Forward end portion 50 additionally is formed as having an inner radial surface, 58, extending intermediate first and second ends 54 and 56 from a rearward circumferential gland or groove portion, referenced at 60, to a forward circumferential camming surface, 64. Camming surface 64, which is provided as a rearwardly-inclined, ramped or tapered surface, defines an acute angle, referenced at θ, of from about 5°–45° with longitudinal axis 48 which is shown in phantom at 48'. Gland portion 60, which is configured to receive ring member 40 therein, is bounded by a generally upstanding rearward end wall, 66, and a forward end wall defined by camming surface 64. Optionally, and as is shown at 68, the forward end wall of camming surface 64 may be configured to define a second acute angle, α, with axis 48'. As is also shown, rearward first end 54 of opening forward end portion 50 preferably is provided to extend radially inwardly to a circumferential shoulder portion, 70, defining, in turn, the upstanding rearward end wall 66 of gland 60.

Figures 3A, 3B:
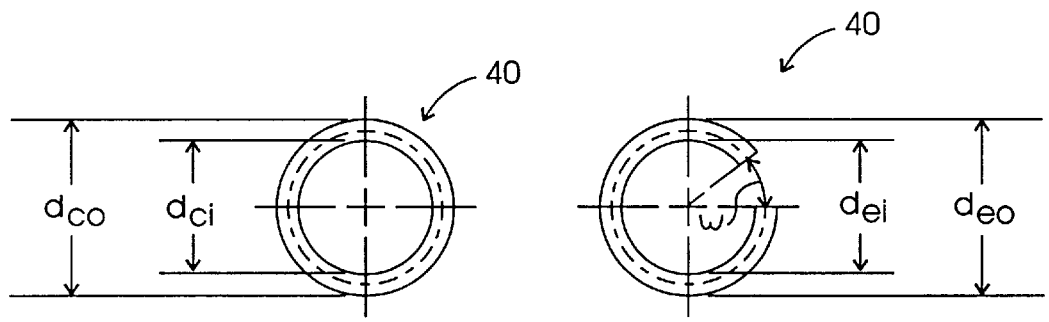
FIG. 3A is a detailed top view showing the split ring of the coupling of FIG. 2 in a compressed orientation.
FIG. 3B is a detailed top view showing the split ring of FIG. 3A in an expanded orientation.

Locking member 40 is journalled coaxially within gland 60 of compression member 42 to be received therewith over the distal end 12 of tubing 14. Looking to FIG. 3, locking member 40 may be seen to be provided in a preferred embodiment of the invention as a resilient split ring which compressible radially inwardly, as is shown in FIG. 3A, to a compressed diameter having inner and outer dimensions, $d_{ci}$ and $d_c$, respectively. Locking member 40 is likewise resiliently expandable radially outwardly, as is shown in FIG. 3B, by a angular distance, ω, to an expanded diameter having expanded inner, $d_{ei}$, and outer, $d_{eo}$, component dimensions. By "resilient," it is meant that ring 40 exhibits a degree of hysteresis or elastic deformation, i.e., spring or "snap-back," to be alternately compressible or expandable from a normal inner diameter which is intermediate expanded inner diameter $d_{ei}$ and compressed inner diameter $d_{ci}$.

Figures 4A, 4B, 4C, 4D:
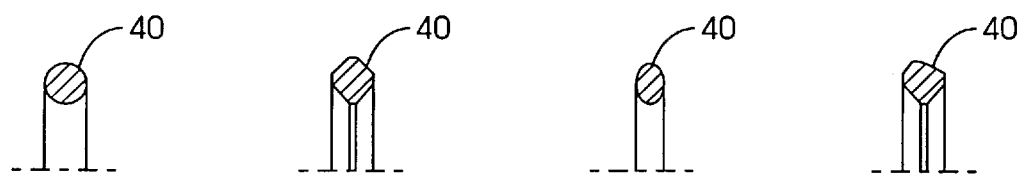
FIG. 4A is a partial cross-sectional views of the split ring of FIGS. 1 and 2 showing the generally circular cross-sectional profile thereof.
FIGS. 4B–D are partial cross-sectional views depicting representative alternative cross-sectional profiles for the split ring of FIGS. 1 and 2.
Figure 5:
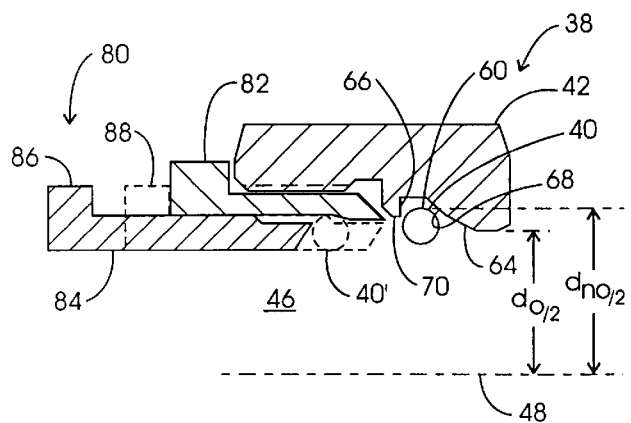
FIG. 5 is a partial longitudinally-sectioned side view of the coupling of FIG. 1 showing the mounting of the split ring thereof.

Preferably, ring 40 is configured such that it assumes a generally circular geometry about the tubing distal end when compressed. In this regard, ring 40 may be constructed from a length of an extruded wire material which is cold worked or otherwise formed into a closed circular geometry, and then partially opened to define the normal inner diameter of the ring. Ring 40 also may be molded or machined into a circular geometry which is then cut and expanded to the normal inner diameter of the ring. Alternately, ring 40 may be sectioned to define a generally C-shaped configuration. The cross-sectional profile of ring 40 is not considered critical to the functioning of coupling 38, with representative profiles being shown in FIG. 4 to include circular (FIG. 4A), hexagonal (FIG. 4B), elliptical or oblique (FIG. 4C), and other polygonal (FIG. 4D) geometries.

Figure 2:
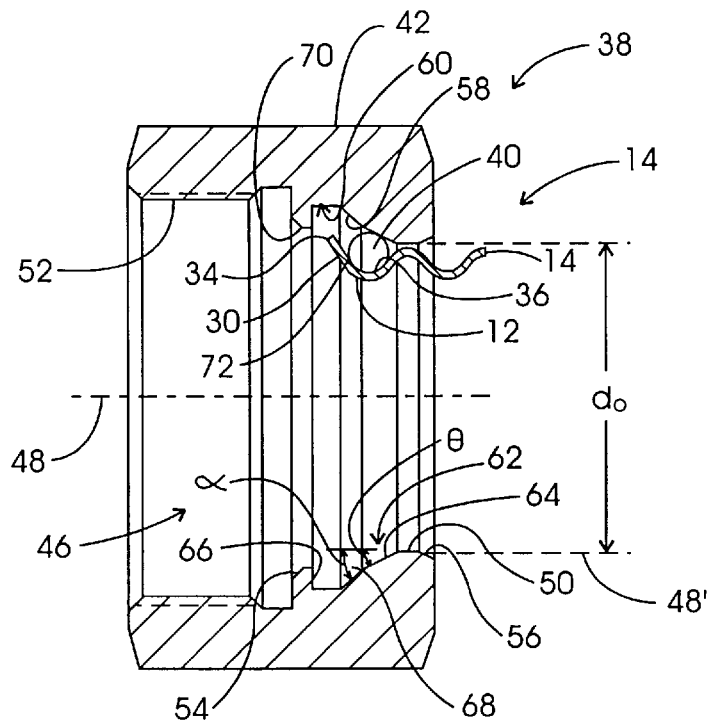
FIG. 2 is a longitudinally-sectioned side view showing the coupling of FIG. 1 as assembled and received over the distal end of the tubing for the connection thereof to the fitting.

Returning to FIG. 2, as coaxially received over the distal end 12 of tubing 14 with compression member 42, ring 40 is received within root portion 32 of tubing 14. As is shown, at least the first crest portion 34 of tubing distal end 12 is flared or otherwise collapsed to present a rearwardly-tapered surface, 72, which is configured for an abutting, fluid-tight engagement with the forwardly-tapered end surface 22 of fitting 16 (FIG. 1).

Considering next FIGS. 5–8, the assembly of coupling 38 is sequentially described. Looking initially in this regard to FIG. 5, in accordance with the precepts of the present invention, the coupling may be pre-assembled for a simplified installation in the field with the mounting of ring 40 into gland 60 of compression member 42. To facilitate this mounting, a tool, shown generally at 80, may be provided as including a cylindrical outer guide member, 82, and a cylindrical inner plunger, 84, slidably positioned therein. Guide member 82 is configured to receive ring 40, shown in phantom at 40', in a partially compressed orientation, and is insertable with ring 40 and plunger 84 into opening 46. As disposed within opening 46, plunger 84 is slidable within guide member 82 from a rearward first position, referenced at 86, to a forward second position, shown superimposed in phantom at 88, to urge ring 40 out of guide member 82 and into gland 60 of compression member 42. Ring 40 is thereby positioned within gland 40 intermediate the rearward and forward end walls 66 and 68 thereof, and therein expands to its normal outer diameter, referenced at $d_{no}/2$, which is larger than the inner diameters of both opening 46, referenced at $d_o/2$, and the opening defined by shoulder portion 70. With coupling 38 thus pre-assembly as described, ring 40 is advantageously retained within compression member 42.

Figure 6:
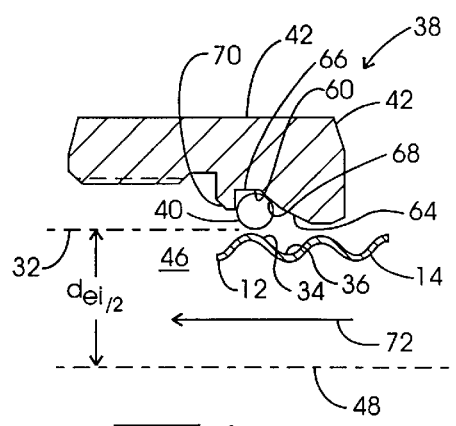
FIG. 6 is a partial longitudinally-sectioned side view of the coupling of FIGS. 1 and 2 showing the expansion of the split ring thereof responsive to the insertion of the tubing distal end.
Figure 7:
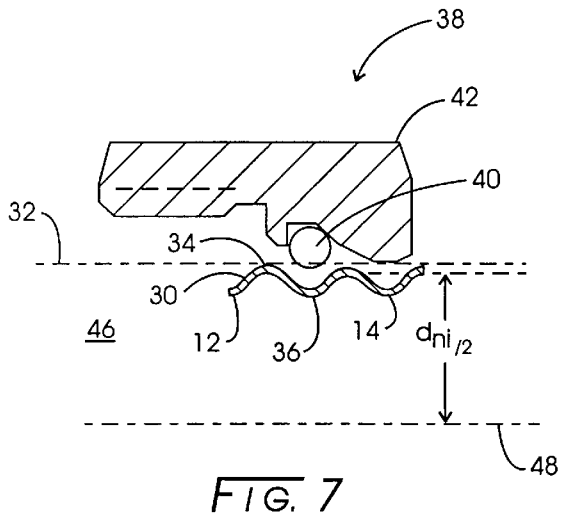
FIG. 7 is a partial longitudinally-sectioned side view of the coupling of FIG. 6 showing the disposition of the split ring thereof into a root portion of one of the tubing corrugations.

Turning next to FIGS. 6 and 7, the assembly of coupling 38 continues in FIG. 6 with the coupling being received coaxially over the distal end 12 of tubing 14. That is, tubing distal end 12 is advanced rearwardly in the direction of arrow 72 through opening 46 of compression member 42. As at least the first crest portion 34 of tubing 14 is advanced through opening 46, locking ring 40 is responsive to the bearing of the crest portions thereon in being expanded radially outwardly within gland 60. In such orientation, ring 40 is of an expanded inner diameter, referenced at $d_{ei}/2$, which accommodates the passage of the tube outer periphery 32 therethrough. Continuing with FIG. 7, with at least the first crest portion 34 of tubing 14 advanced to its rearward terminus, ring 40 is thereby disposed within, for example, the first root portion 36 of the tubing. In this orientation, ring 40 resiliently returns to its normal inner diameter, referenced at $d_{ni}/2$, which preferably is smaller than the tubing outer periphery 32. In this way, ring 40 and compression member 42 may be retained on the tubing 14 to facility the handling of the assembly in the field.

Figure 8:
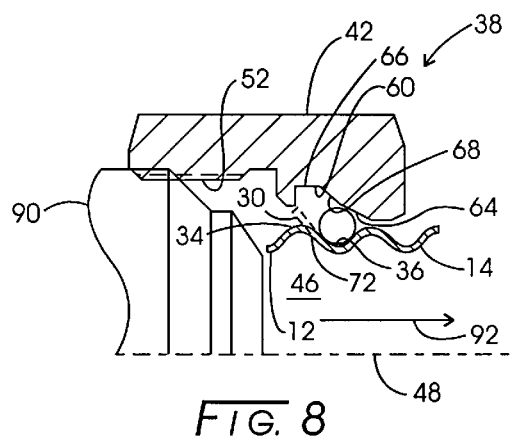
FIG. 8 is a partial side view of the coupling of FIG. 7 showing the flaring of the tubing distal end.

Referring next to FIG. 8, the assembly of coupling 38 onto tubing 14 concludes with the flaring of the distal end 12 thereof. As was aforementioned, the crest portion 34 of at least the first tubing corrugation 30 may be collapsed to present rearwardly-tapered surface 72 which is shown in phantom for illustrative purposes. For effecting the collapse of corrugation 30, a conventional flaring tool, 90, may threaded into the rearward end portion 52 of compression member 42 and forwardly advanced in the direction shown at 92 into a compressive engagement with the corrugation.

Figure 9:
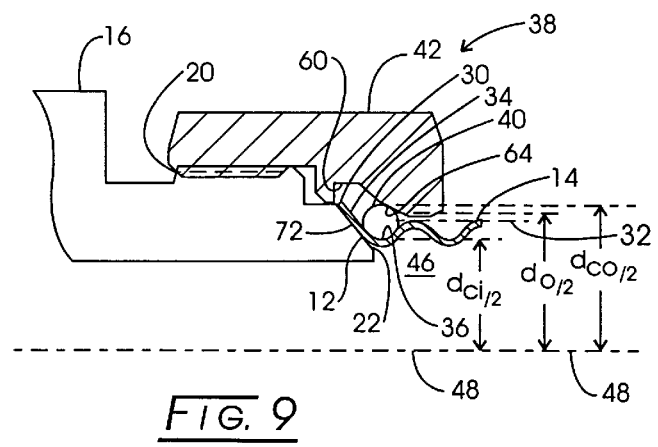
FIG. 9 is a partial side view showing the connection of the coupling of FIG. 2 to its associated fitting.

Looking lastly to FIG. 9, the connection of the assembled coupling 38 and tubing 14 to fitting 16 is illustrated. With the internally threaded end portion 52 of compression member 42 threadably engaging the external threads of the forward end 20 of fitting 16, the rearward surface 72 of tubing distal end 12 is urged into a removable abutting, fluid-tight engagement with the fitting forward end 22. Concomitantly, locking ring 40 is resiliently compressed, responsive to the bearing of camming surface 64 thereon, radially inwardly within root portion 36 of tubing 14 to a compressed orientation having the inner and outer diameter components referenced, respectively, at $d_{ci}/2$ and $d_{co}/2$. As is shown, fitting end 22 is disposed generally parallel to or otherwise defines an acute angle with respect to camming surface 64 to receive the ring 40 in its radially-inwardly compressed orientation along with the flared surface 72 of tubing end 12. Particularly in such orientation, the compressed inner diameter $d_{ci}/2$ of ring 40 is provided to be smaller than the tube outer periphery 32, and the compressed outer diameter $d_{co}/2$ of the ring is provided to be larger than the inner diametric extent, referenced at $d_o/2$, of compression member opening 46. With the compression of ring 40 by camming surface 64, the forward advancement of the tubing distal end 14 out of opening 46 is thereby delimited to effect a robust, fluid-tight connection of the tubing to the fitting.

Thus, a unique coupling construction for corrugated tubing is described herein which facilitates and simplifies assembly, and which may be used to achieve a fluid-tight or other secure connection in a single operation. Such construction additionally is adapted for use with existing fittings as may be associated with an appliance, fuel line, or the like.

Materials of construction for coupling 38 are to be considered conventional for the uses involved. Such materials generally will be corrosion resistant, but particularly will depend upon the fluid or fluids being handled. A metal material such as a mild or stainless steel or brass is preferred for durability, although other types of materials such as plastics may be substituted, however, again as selected for compatibility with the fluid being transferred or for desired mechanical properties. Preferred plastic materials include poly(ether ether ketones), polyimides, polyetherimides, polybutylene terephthalates, nylons, fluoropolymers, polysulfones, polyesters, and acetal homo and copolymers. Regarding locking member 40, the selected metal or plastic material may be annealed or otherwise heat or chemically treated to achieve the desired degree of elasticity.

As it is anticipated that certain changes may be made in the present invention without departing from the precepts herein involved, it is intended that all matter contained in the foregoing description shall be interpreted in as illustrative rather than in a limiting sense. All references cited herein are expressly incorporated by reference.

What is claimed is:

1. A coupling for connecting a distal end of a corrugated tube in fluid communication with a fitting of a variety having a forward end with an externally threaded surface, the tube being formed of alternating crest portions defining the outer periphery of the tube and root portions, said coupling comprising:

a generally annular compression member having an opening therethrough extending axially along a central longitudinal axis from a forward end portion of an inner diametric extent receivable coaxially over the distal end of the tube to an internally-threaded rearward end portion threadably engagable with the externally-threaded forward end of the fitting, said opening forward end portion extending axially along said central longitudinal axis from a rearward first end to a forward, radially-inwardly extending second end which defines the inner diametric extent of said opening, and having an inner radial surface extending intermediate said first and seconds ends from a rearward circumferential gland having a forward and a rearward end wall to a forward circumferential camming surface; and an annular one-piece split ring member journalled coaxially within said gland of said compression member to be received therewith over the distal end of the tube for disposition into a root portion thereof, said split ring member being retained axially in said gland intermediate the forward and rearward end walls thereof and being resiliently expandable radially outwardly within said gland in response to the bearing of the crest portions of the tube thereon to an expanded diameter accommodating the passage of the outer periphery of the tube therethrough for said split ring member and compression member to be received over the distal end of the tube, and being resiliently compressible radially inwardly within said root portion of the tube in response to the bearing of the camming surface of said compression member thereon as said compression member is threadably engaged with the fitting to a compressed diameter delimiting the forward advancement of the tube distal end out of said opening of said compression member.

2. The coupling of claim 1 wherein said split ring member has a generally circular, oblique, or polygonal cross-sectional profile.

3. The coupling of claim 1 wherein said first end of said compression member opening forward end portion extends radially inwardly to a circumferential shoulder portion which defines said rearward end wall of said gland.

4. The coupling of claim 1 wherein said gland of said compression member opening forward end is configured as a generally circumferentially-continuous, annular groove.

5. A fluid coupling assembly for connecting a distal end of a corrugated tube in fluid communication with a fitting of a variety having an externally-threaded forward end which terminates in a generally forwardly tapered surface, the tube being formed of alternating crest portions defining the outer periphery of the tube and root portions, and the distal end thereof terminating at a first crest portion, said coupling comprising:

a generally annular compression member having an opening therethrough extending axially along a central longitudinal axis from a forward end portion of an inner diametric extent received coaxially over the distal end of the tube to an internally-threaded rearward end portion threadably engagable with the externally-threaded forward end of the fitting, said opening forward end portion extending axially along said central longitudinal axis from a rearward first end to a forward, radially-inwardly extending second end which defines the inner diametric extent of said opening, and having an inner radial surface extending intermediate said first and seconds ends from a rearward circumferential gland having a forward and a rearward end wall to a forward circumferential camming surface; and an annular one-piece split ring member journalled coaxially within said gland of said compression member and received therewith over the distal end of the tube into a root portion thereof, said split ring member being retained axially in said gland intermediate the forward and rearward end walls thereof and being resiliently expanded radially outwardly within said gland responsive to the bearing of the crest portions of the tube thereon to an expanded diameter accommodating the passage of the outer periphery of the tube therethrough for said split ring member to be received with said compression member received over the distal end of the tube, and being resiliently compressible radially inwardly within said root portion of the tube responsive to the bearing of the camming surface of said compression member thereon as said compression member is threadably engaged with the fitting to a compressed diameter delimiting the forward advancement of the tube distal end out of said opening of said compression member.

6. The assembly of claim 5 wherein said ring member has a generally circular, oblique, or polygonal cross-sectional profile.

7. The assembly of claim 5 wherein said first end of said compression member opening forward end portion extends radially inwardly to a circumferential shoulder portion which defines said rearward end wall of said gland.

8. The assembly of claim 5 wherein said gland of said compression member opening forward end is configured as a generally circumferentially-continuous, annular groove.

9. A method of coupling a distal end of a corrugated tube in fluid communication with a fitting of a variety having an externally-threaded forward end which terminates in a generally forwardly tapered surface, the tube being formed of alternating crest portions defining the outer periphery of the tube and root portions, and the distal end thereof terminating at a first crest portion, said method comprising the steps of:

(a) providing a generally annular compression member having an opening therethrough extending axially along a central longitudinal axis from a forward end portion of having a first inner diametric extent receivable coaxially over the distal end of the tube to an internally-threaded rearward end portion threadably engagable with the externally-threaded forward end of the fitting, said opening forward end portion extending axially along said central longitudinal axis from a rearward first end to a forward, radially-inwardly extending second end which defines the first inner diametric extent of said opening, and having an inner radial surface extending intermediate said first and seconds ends from a rearward circumferential gland having a forward and a rearward end wall to a forward circumferential camming surface;

(b) journalling an annular one-piece split ring member coaxially within said gland of said compression member, said split ring member being retained axially in said gland intermediate the forward and rearward end walls thereof and being resiliently expandable radially outwardly within said gland to an expanded diameter, and being resiliently compressible radially inwardly to a compressed diameter;

(c) advancing the distal end of the tube rearwardly through the opening of said compression member to dispose said split ring member in a root portion of the tube, said split ring member being expanded radially outwardly within said gland of said compression member responsive to the bearing of the crest portions of the tube thereon to said expanded diameter accommodating the passage of the outer periphery of the tube therethrough; and (d) threadably engaging said rearward end portion of said compression member with the forward end of the fitting, said split ring member being resiliently compressed radially inwardly within said root portion of the tube responsive to the bearing of the camming surface of said compression member thereon to said compressed diameter delimiting the forward advancement of the tube distal end out of said compression member opening.

10. The method of claim 9 wherein said ring member has a generally circular, oblique, or polygonal cross-sectional profile.

11. The method of claim 9 wherein said compression member is provided in step (a) with said first end of said opening forward end portion extending radially inwardly to a circumferential shoulder portion which defines said rearward end wall of said gland.

12. The method of claim 9 wherein said compression member is provided in step (a) with said gland of said opening forward end being configured as a generally circumferentially-continuous, annular groove.

13. The method of claim 9 further comprising the additional step between steps (c) and (d) of flaring the distal end of the tube to collapse at least the first crest portion thereof to present a rearwardly tapered surface configured for an abutting, fluid-tight engagement with the forwardly tapered surface of the fitting.

14. The method of claim 9 further comprising the additional step prior to step (b) of providing an assembly tool comprising:

a cylindrical outer guide member configured to receive said split ring member therein, and being insertable within the opening of said compression member through the rearward end portion thereof; and a cylindrical inner plunger member received within said outer member for sliding movement from a rearward first position to a forward second position, and wherein said split ring member is journalled within said compression member in step (b) by receiving said split ring member within the guide member of the tool, inserting the guide member within the opening of said compression member, and moving the plunger member from its first to its second position urging said split ring member from the guide member and into said gland of said compression member.

15. The method of claim 9 wherein said split ring member of step (b) has a normal inner diameter smaller than the outer periphery of the tube retaining said compression member on the tube.

* * * * *